United States Patent [19]
Ropp

[11] Patent Number: 5,584,460
[45] Date of Patent: Dec. 17, 1996

[54] ADJUSTABLE SEAT APPARATUS AND CONTROLS

[75] Inventor: Dale Ropp, Buda, Ill.

[73] Assignee: Sears Manufacturing Co., Davenport, Iowa

[21] Appl. No.: 415,058

[22] Filed: Mar. 31, 1995

[51] Int. Cl.⁶ .................................................. F16M 13/00
[52] U.S. Cl. ...................... 248/423; 248/425; 297/344.1; 297/344.2
[58] Field of Search ..................................... 248/425, 429, 248/423, 419, 420, 416, 415; 297/344.1, 344.24, 344.22; 296/65.1

[56] References Cited

U.S. PATENT DOCUMENTS

| | | | |
|---|---|---|---|
| 2,833,367 | 5/1958 | Pool et al. | 297/344.22 X |
| 4,005,845 | 2/1977 | Luppi et al. | 248/419 |
| 4,014,507 | 3/1977 | Swenson et al. | 248/425 X |
| 4,093,197 | 6/1978 | Carter et al. | 267/141 |
| 4,155,593 | 5/1979 | Swenson et al. | 297/344.22 X |
| 4,183,493 | 1/1980 | Koutsky | 248/430 |
| 4,241,893 | 12/1980 | Koutsky et al. | 248/425 |
| 4,455,009 | 6/1984 | Foster et al. | 248/561 |
| 4,705,256 | 11/1987 | Hofrichter | 248/425 X |
| 4,856,763 | 8/1989 | Brodersen et al. | 267/131 |
| 5,125,631 | 6/1992 | Brodersen et al. | 267/131 |
| 5,292,179 | 3/1994 | Forget | 248/425 X |

Primary Examiner—Ramon O. Ramirez
Attorney, Agent, or Firm—Niro, Scavone, Haller & Niro

[57] ABSTRACT

An adjustable seat support assembly and controls which allow the operator to independently or simultaneously swivel or slide the seat using control handles which are fixed relative to the seat and which may be operated independently and simultaneously.

6 Claims, 2 Drawing Sheets

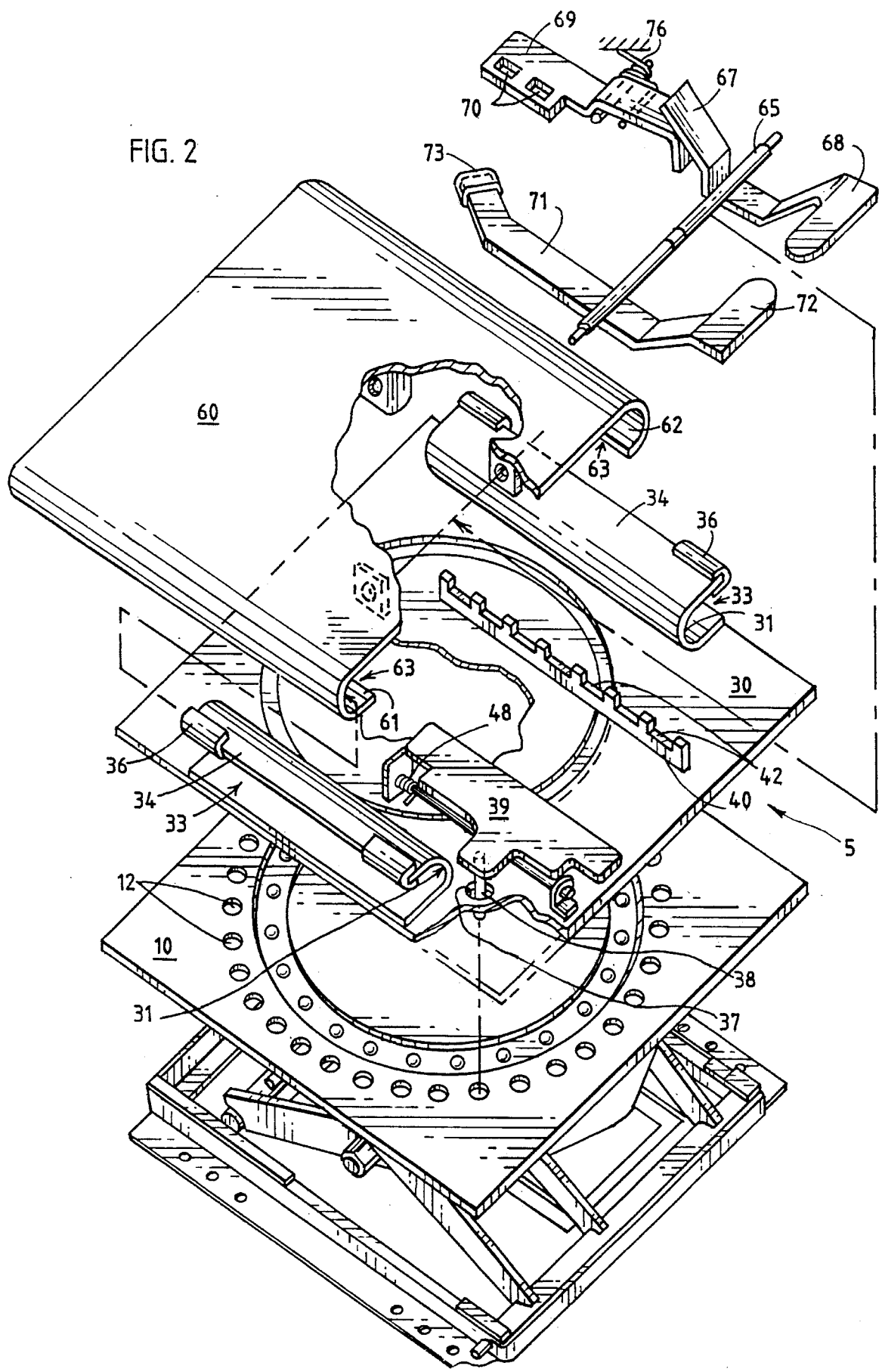

5,584,460

ADJUSTABLE SEAT APPARATUS AND CONTROLS

BACKGROUND OF THE INVENTION

The present invention relates generally to an adjustable seat control assembly and, move specifically, to a vehicle seat mount and control assembly which allows unrestricted rotational and linear adjustment using rotational and linear adjustment controls which move with the seat and which may be operated independently or simultaneously to adjust the seat rotationally and/or linearly.

Many vehicles require an operator or passenger to be able to rotate his or her seat to operate the vehicle in any direction. For instance, the operator of heavy equipment like a backhoe needs to be able to operate the vehicle in many different directional orientations. In such vehicles, it would be very beneficial if the operator could mechanically adjust the fore and aft displacement of the vehicle seat from any possible rotational orientation.

The present invention provides an easy-to-use, economical and safe mechanical device for allowing a seat occupant to slide the seat fore and aft from any rotational direction easily by allowing the rotational and fore-aft displacement actuation handles to travel with the seat rotationally and linearly. The present invention allows the seat to slide linearly relative to the angular orientation of the seat, as opposed to relative to the front and rear of the vehicle.

SUMMARY OF THE INVENTION

A primary object of the present invention is to provide a seat support assembly which allows seat rotational adjustment and fore-aft adjustment using adjustment handles or actuators positioned in side-by-side relation and mounted to travel with the seat. The present invention, thus, allows a seat occupant to simultaneously or independently adjust the seat rotationally and/or linearly. The present invention thereby allows a seat occupant to adjust the seat support assembly rotationally and linearly with one hand from any seat orientation and frees up the other hand to operate the vehicle. The present invention further allows linear adjustment relative to the rotational orientation of the seat as opposed to vehicular orientation.

The present invention therefore provides an adjustable seat support assembly comprising a lower swivel plate, an upper swivel plate rotatably mounted to the lower swivel plate and having a slide latch track and swivel latch pin, and a slide plate slidably mounted to the upper swivel plate and having actuation handles mounted side-by-side to facilitate rotation and sliding from any seat orientation.

DESCRIPTION OF THE DRAWINGS

The novel features which are characteristic of the present invention are set forth in the appended claims. However, the invention's preferred embodiments, together with further objects and attendant advantages, will be best understood by reference to the following detailed description taken in connection with the accompanying drawings in which:

FIG. 2 is an exploded perspective view of the present invention.

DESCRIPTION OF THE PREFERRED EMBODIMENTS

Figure 1:
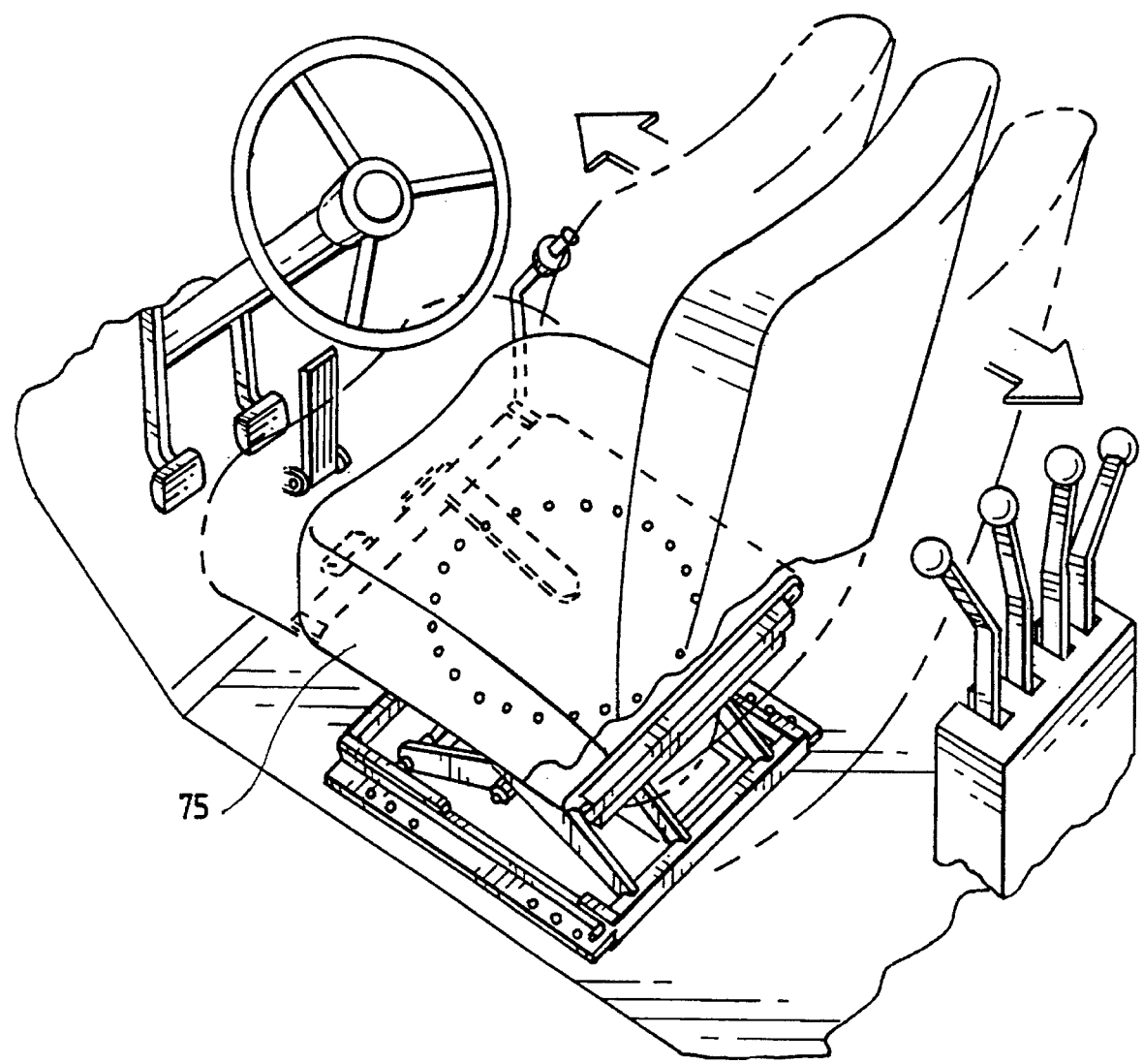
FIG. 1 is a perspective view illustrating the operational setting of the present invention.

The preferred embodiment of the present invention, designated generally 5 in FIG. 2 includes a lower swivel plate, an upper swivel plate and a slide plate. The seat is mounted to the slide plate which carries the seat adjustment handles. The lower swivel plate 10 is mountable to a vehicle structure or seat suspension assembly in which the seat will be utilized. Typical examples of conventional seat suspensions are disclosed in U.S. Pat. Nos. 4,093,197; 4,856,763; and 5,125,631. The upper swivel plate is rotatably mounted on the lower plate and below the slide plate. Thus, when the seat rotates with the upper swivel plate, the slide plate also rotates, allowing the seat to be adjusted in any rotational or linear direction.

Referring now to FIG. 2, lower swivel plate 10 of the present invention has spaced, swivel latch pin holes 12 in a circular configuration. Rotatably mounted to lower swivel plate 10 is upper swivel plate 30. Various means exist for rotatably securing lower swivel plate 10 to upper swivel plate 30 and are well known to those of ordinary skill in the art and will not be specifically described here. Mounted on, or an integral part of either side of, upper swivel plate 30 along the length parallel to the slide path of seat 75 are elongated, upward-protruding flanges 31 which are C-shaped in cross section, the "mouths" 33 of flanges 31 being directed outward. Flanges 31 have top portion 34 parallel to the plane of upper swivel plate 30. Each flange 31 on upper swivel plate 30 has plastic slider bearings 36 attached along top portions 34. Suitable slider bearings are well known to those of ordinary skill in the art. Any suitable slider bearings as are known in the art will suffice.

On upper swivel plate 30, and disposed above circularly arranged holes 12 of lower swivel plate 10, is hole 37 which accommodates a vertically movable swivel latch pin 38. Both hole 37 and pin 38 rotate on the same radius as that of the circle defined by latch pin holes 12. Swivel latch pin 38 is carried by pivotally mounted swivel latch bar 39. Swivel latch bar 39 is an elongated, flat, rigid bar and is mounted parallel to the seat slide path. A spring 48 biases swivel latch bar 39 and pin 38 downward and into engagement with one of the holes 12 of lower swivel plate 10, thus preventing rotation of the seat 75. When actuated, swivel latch bar 39 lifts swivel latch pin 38, disengaging hole 12 and allowing rotation of the seat.

Also on upper swivel plate 30 is slide latch track 40. Slide latch track 40 is an elongated, rigid track and has vertically oriented teeth 42. Slide latch track 40 is mounted on upper swivel plate 30 parallel to the slide path.

Slide plate 60 is slidably mounted on upper swivel plate 30. Slide plate 60 has downward-extending flanges 61, 62 on either side parallel to the slide path. Flanges 61, 62 are C-shaped in cross-section, the "mouths" 63, 64 of flanges 61, 62 being directed inward. Slide plate flanges 61, 62 slidably engage swivel plate flanges 31 and plastic slider bearings 36 thereby securing seat 75 to seat mount assembly 10 while allowing seat 75 to slide, and preventing any other movement of slide plate 60 relative to upper swivel plate 30. While this means of slidably mounting the slide plate to the upper swivel plate is preferred, a variety of means exist to accomplish the same function which are well known to those of ordinary skill in the art. See, e.g., U.S. Pat. No. 4,183,493. Any suitable means of slidably mounting the slide plate to the upper swivel plate is acceptable.

Pivotally mounted on the under side of slide plate 60 is depending pivot pin 65. A slide actuator arm 67 and a swivel actuator arm 71 are both pivotally mounted to pivot pin 65. At one end of slide actuator arm 67 is slide actuator handle 68. The other end of slide actuator arm 67 engages an actuation lever 69 having holes 70 configured and disposed to engage slide latch teeth 42. Actuator lever 69 is spring-biased to maintain engagement with slide latch teeth 42 and arm 67. Lifting slide actuator handle 68 causes slide actuator arm 67 to disengage slide latch teeth 42 and allows seat 75 to slide. Releasing slide actuator handle 68 allows the spring 76 to cause holes 70 in slide latch arm 67 to re-engage with slide latch teeth 42 and prevent sliding.

Swivel actuator arm 71 is pivotally mounted adjacent slide actuator arm 67 and has at one end a swivel actuator handle 72 and at the other end plastic bearing pad 73. Swivel actuator handle 72 is disposed adjacent slide actuator handle 68. Plastic bearing pad 73 contacts swivel latch bar 39 on upper swivel plate 30. Plastic bearing 73 contacts the side of swivel latch bar 39 opposite the side of swivel latch bar 39 which carries swivel latch pin. 38. Lifting swivel actuator handle 72 actuates latch bar 39 which, in turn, lifts swivel latch pin 38 upward and disengages the pin from hole 12. When swivel actuator handle 72 is released, swivel latch pin 38 drops into one of lower swivel plate hole 12, preventing rotation. As slide plate 60 moves-relative to swivel plate 30, plastic bearing pad 73 moves along and maintains contact with swivel latch bar 39.

It is apparent, therefore, that the operator may independently or simultaneously achieve swivel and/or slide adjustment of the seat by operating independently or simultaneously swivel actuator handle 72 and/or slide actuator handle 68. Furthermore, because the two handles 68, 72 are disposed side-by-side on slide plate 60, the operator can adjust seat 75 in any direction with just one hand, leaving the other hand free to operate the vehicle. Additionally, because the actuator handles 68, 72 are attached to slide plate 60, the actuator handles will always maintain the same position relative to the seat occupant.

of course, it should be understood that various changes and modifications to the preferred embodiments described herein will be apparent to those skilled in the art. Other changes and modifications, such as those expressed here or others left unexpressed but apparent to those of ordinary skill in the art, can be made without departing from the spirit and scope of the present invention and without diminishing its attendant advantages. It is, therefore, intended that such changes and modifications be covered by the following claims.

What is claimed is:

1. A slidably and rotationally adjustable seat support assembly comprising:

a lower swivel plate having a plurality of apertures;

an upper swivel plate rotatably mounted to the lower swivel plate, having a slide latch track provided with a plurality of teeth and a pivotally mounted swivel latch bar provided with a swivel latch pin; and a slide plate slidably mounted to the upper swivel plate, having a swivel actuator arm provided with a swivel handle extending from one side of the slide plate and a slide actuator arm provided with a slide actuator handle extending from said one side of the slide plate and positioned adjacent the swivel actuator handle; said swivel actuator arm being adapted to actuate said swivel latch bar-and pin to permit or prevent rotational movement of said upper swivel plate relative to said lower swivel plate; and said slide actuator arm being adapted to engage or disengage said slide latch teeth to permit or prevent linear movement of said slide plate relative to said upper swivel plate.

2. The adjustable seat support assembly of claim 1 further comprising:

the upper swivel plate having vertically oriented flanges on either side being substantially C-shaped in cross-section and having top portions substantially parallel to the plane of the upper swivel plate;

plastic slider bearings attached along the top portions of the upper swivel plate flanges;

the swivel latch pin configured to engage one of said lower swivel plate apertures to prevent rotational movement of said upper swivel plate relative to said lower swivel plate; and the slide plate having depending flanges being substantially C-shaped in cross section to slidably engage the plastic slider bearings to facilitate sliding of the slide plate relative to the upper swivel plate.

3. The adjustable seat support assembly of claim 1 wherein the swivel latch pin is biased to prevent rotational movement until actuated by said swivel actuator arm; and the slide actuator arm is biased to engage the slide latch teeth to prevent linear movement until actuated.

4. The adjustable seat support assembly of claim 1 further comprising:

the slide actuator handle and the swivel actuator handle being in substantially the middle of the front of the slide plate.

5. The adjustable seat support assembly of claim 2 further comprising the upper swivel plate flanges being an integral part of the upper swivel plate; and the slide plate flanges being an integral part of the slide plate.

6. A slidably and rotationally adjustable seat support assembly comprising:

a lower swivel plate having a plurality of apertures;

an upper swivel plate rotatably mounted to the lower swivel plate, having a slide latch track and a pivotally mounted swivel latch bar provided with a swivel latch pin; and a slide plate slidably mounted to the upper swivel plate, having a swivel actuator arm and a slide actuator arm, said swivel actuator arm adapted to actuate said swivel latch bar and pin to permit or prevent rotational movement of said upper swivel plate relative to said lower swivel plate; and said slide actuator arm being adapted to engage or disengage said slide latch track to permit or prevent linear movement of said slide plate relative to said upper swivel plate.

\* \* \* \* \*